(12) United States Patent
deLaneuville

(10) Patent No.: US 7,387,030 B1
(45) Date of Patent: Jun. 17, 2008

(54) PROCESS FOR DETERMINING A REMAINING LIFE FOR A GAS TURBINE AIRFOIL

(75) Inventor: Robert E. deLaneuville, North Palm Beach, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 283 days.

(21) Appl. No.: 11/437,521

(22) Filed: May 20, 2006

Related U.S. Application Data

(60) Provisional application No. 60/783,651, filed on Mar. 17, 2006.

(51) Int. Cl.
*G01N 3/32* (2006.01)
(52) U.S. Cl. .......................... 73/808; 73/760
(58) Field of Classification Search .................. 73/808, 73/760
See application file for complete search history.

(56) References Cited

U.S. PATENT DOCUMENTS

| | | | | |
|---|---|---|---|---|
| 5,654,500 A | * | 8/1997 | Herron et al. | 73/116 |
| 6,532,825 B1 | * | 3/2003 | Abe | 73/804 |
| 7,117,574 B2 | * | 10/2006 | Liu et al. | 29/407.01 |
| 2004/0016326 A1 | * | 1/2004 | Liu et al. | 82/1.11 |

* cited by examiner

*Primary Examiner*—Max Noori
(74) *Attorney, Agent, or Firm*—John E. Ryznic

(57) ABSTRACT

A process for determining a remaining life of a part, such as an airfoil in a gas turbine engine, comprising the steps of establishing the boundary conditions that act on the part, determining the material properties of the part, creating a 3D finite element model of the part and determining the residual stresses on the part, observing the actual part for cracks, and comparing the location of the crack to the residual stresses determined on the model at the crack location. If the residual stress at the crack location passes into the wall of the part beyond a predetermined length, then the part is rejected for further use.

6 Claims, 2 Drawing Sheets

PROCESS FOR DETERMINING A REMAINING LIFE FOR A GAS TURBINE AIRFOIL

CROSS-REFERENCE TO RELATED APPLICATIONS

This application claims the benefit to an earlier filed U.S. Provisional application Ser. No. 60/783,651 filed on Mar. 17, 2006 and entitled PROCESS FOR DETERMINING A REMAINING LIFE FOR A GAS TURBINE AIRFOIL.

STATEMENT REGARDING FEDERALLY SPONSORED RESEARCH OR DEVELOPMENT

None.

BACKGROUND OF THE INVENTION

1. Field of the Invention

The present invention relates to a process of determining a remaining life for a part, and more specifically to determining a remaining life for an airfoil used in the gas turbine engine.

2. Description of the Related Art Including Information Disclosed Under 37 CFR 1.97 and 1.98

Industrial gas turbine engines (and even aero gas turbine engines) use several stages of blades and vanes in the turbine section of the engine that are under high temperature loads as well as mechanical loads. The airfoils include cooling air holes opening onto the outer surface of the airfoils for passing cooling air through and over the airfoil for cooling purposes. In an industrial gas turbine engine (IGT), the engine operates for a long period of time, or cycle, typically of around 40,000 hours before the engine is shut down for inspection and maintenance. Any premature shut down due to a problem like a damaged airfoil can be very costly due to the engine not performing its intended function like power generation. Because of the temperature, pressure and mechanical loads applied to the airfoil during operation, stresses occur. Also, residual stresses develop on the airfoil as the airfoil cools down to ambient temperature after shut-down of the engine. The residual stresses cause cracks to develop on the surface, typically starting at the cooling hole and extending outward thereof, when the airfoil cools down from its normal operating temperature. If the residual stresses on the airfoil extend into the wall of the airfoil fare enough, the cause can propagate through the wall of the airfoil, resulting in the airfoil to be non-useful.

The blades and vanes used in the turbine section of an industrial gas turbine engine are numerous and also very expensive. A typical IGT (industrial gas turbine) can have 50-100 blades or vanes in each stage, and have four stages, making the number of blades and vanes in the turbine in the order to 800 airfoils. The cost of a set of airfoils in the first stage can exceed one million dollars. Many times, an inspector would remove an airfoil that shows cracks to prevent a possible catastrophic event from occurring when the IGT is in operation. It is very costly to shut down an IGT prematurely. Therefore, an inspector may remove many airfoils that are still useful, even though many cracks appear on the surface. Thus, many used airfoils can accumulate that are not beyond the useful life in a gas turbine engine.

There is a need in the art of gas turbine engines to determine from cracks that appear in an airfoil if that airfoil is still capable of withstanding the operating conditions in the gas turbine engine for another engine operating cycle, or if the airfoil is at or near its useful lifetime.

BRIEF SUMMARY OF THE INVENTION

The present invention is a process of determining if a used airfoil of a gas turbine engine has any remaining life, or if the airfoil is at or near its end of life period. The process involves determining the shape and material properties of an airfoil, modeling the airfoil and determining the residual stresses that would occur around the airfoil based upon proper operating conditions on the airfoil such as temperature loads, pressure loads, and other operating loads, observing the locations of cracks on the real airfoil, and then determining if a residual stress level would occur far enough into the wall of the airfoil to cause the crack to propagate enough weaken the structural strength of the airfoil such that the airfoil cannot be reused in the gas turbine engine. If the residual stresses that occur at the cracks observed on the surface of the airfoil do not pass into the wall of the airfoil enough to cause the cracks to propagate far, then the airfoil is considered to still have useful life and can be reused. The present invention is described for use in determining the useful life for an airfoil. However, the process could be used for any part in which cracks would cause problems in the useful life of the part.

DETAILED DESCRIPTION OF THE INVENTION

Figure 1:
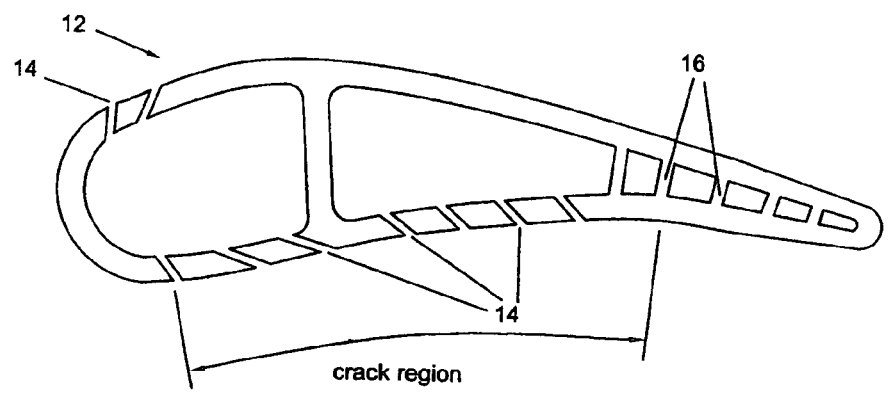
FIG. 1 shows a cross section view of an airfoil in a gas turbine engine.
Figure 2:
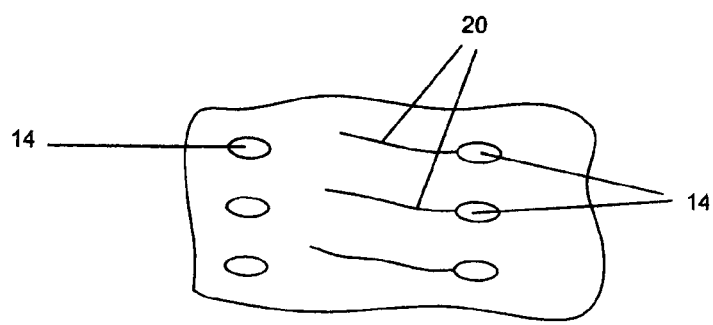
FIG. 2 shows a side view of a region on the airfoil having cooling holes and cracks propagating therefrom.

An airfoil cross section 12, such as a blade of a vane, used in a gas turbine engine is shown in FIG. 1. The airfoil includes a wall extending around the airfoil to define an outer airfoil surface, and a plurality of cooling holes 14 to discharge cooling air onto the airfoil surface for cooling purposes. The airfoil 12 includes ribs 16 located along the trailing edge and midway along the airfoil for structural purposes. FIG. 2 shows a side view of a portion of the airfoil on the pressure side in which a plurality of the cooling holes 14 are shown with cracks 20 propagating out from the holes 14. Cracks can occur at the cooling holes or away from the cooling holes. The cracks result from residual stresses that are formed on the airfoil wall from thermal material fatigue as the airfoil goes from operating temperature and conditions to an inoperative state at an ambient temperature. The cracks are most likely to form along a region on the pressure side of the airfoil identified by the arc in FIG. 1. This is the region of highest temperature load, and also the region in which the cooling holes are located. Cooling holes are located on other regions of the airfoil as well, such as on the leading edge suction side as shown in FIG. 1.

Figure 3:
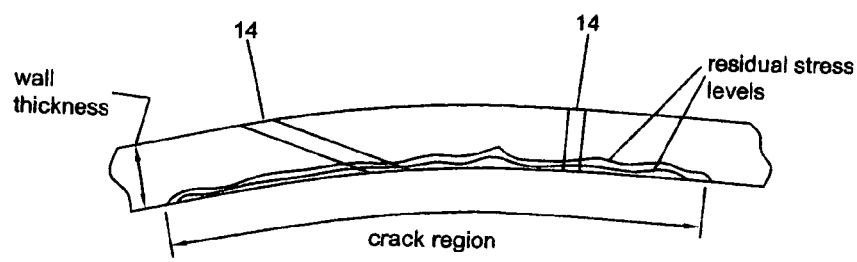
FIG. 3 shows a section of the airfoil in which the cracks occur, and the residual stress levels.

FIG. 3 shows a cross section view of the airfoil 12 in the region on the pressure side of the airfoil where the cracks are most likely to occur. The arc representing the crack forming region identified in FIG. 1 is also shown in FIG. 3. The wall of the airfoil has a certain thickness as identified in the figure. Two cooling holes 14 are shown in FIG. 3, and represent two of the cooling holes shown in FIG. 2 in which a crack occurs from the hole on the right side of the figure. Residual stresses develop in the wall of the airfoil when the airfoil cools down to ambient temperature. Two residual stress contours are shown in FIG. 3. The residual stress will start at the outer wall of the airfoil and progress into the wall toward the inner side of the airfoil. FIG. 3 shows the residual stress region to occupy about 20% of the cross sectional area of the airfoil wall in the crack region.

Figure 4:
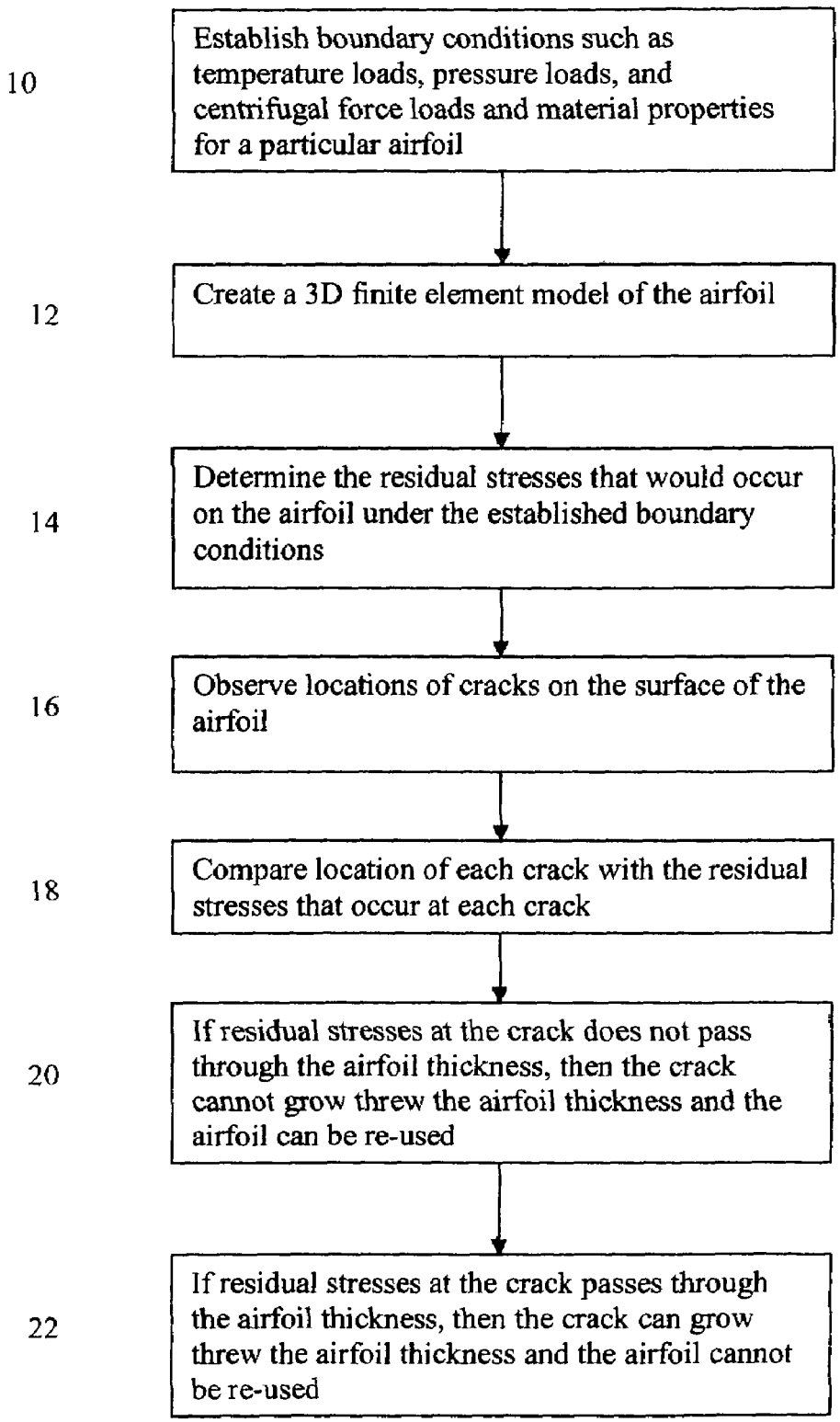
FIG. 4 is a flowchart of the process used in the present invention.

In order to determine if a particular used airfoil is still usable in a gas turbine engine, an inspector will first have to establish the boundary conditions that occur on the airfoil. Boundary conditions such as the temperature loads under operating conditions, the pressure loads, and other loads such as centrifugal force loads are part of the boundary conditions as shown in step 10 of FIG. 4. The inspector would also determine the material properties of the airfoil and the dimensions of the airfoil.

A 3D finite element model of the airfoil is then created (step 12) in order to apply the boundary conditions and determine the residual stresses that occur in the airfoil (step 14). Residual stresses occur in the walls of the airfoil when the airfoil cools down to ambient condition after the engine has been shut down.

The inspector will then observe the actual used airfoil and locate all the cracks on that airfoil (step 16). Each crack will occur on the airfoil where a residual stress will occur. The inspector will compare the location of each crack with the resulting residual stress levels that the computer modeling has produced. As shown in FIG. 3, if the residual stress at the region where the crack is observed does not pass through the wall of the airfoil, then the crack will not pass through the wall of the airfoil if the airfoil is placed again in operation under the conditions modeled. It is known that the crack will propagate into the airfoil wall as far as the residual stresses go. Thus, if the residual stress region does not occupy a significant area of the airfoil wall (such as the 20% region in FIG. 3), then an inspector can reason that the crack will not pass far enough into the airfoil wall such that the structural strength of the airfoil is weakened to the point of being unsafe if used again. The usefulness of an airfoil can be determined by observing the length of the crack growth into the wall versus the time period under which the airfoil was used in the modeled conditions. An airfoil with 40,000 hours of use having a crack passing 50% into the wall could be considered to still have many hours of useful life remaining, since the crack will probably not grow any further as the crack has reached a stable size. However, an airfoil with a crack passing 50% into the wall but having only 1000 hours of use could be considered unusable, since the crack will probably continue to grow with a few hundred hours of use. Another factor that would affect useful life based upon the distance that a crack passes into the wall will be if the airfoil would be structurally weakened, since the crack may be at a critical location on the airfoil.

However, if one crack is located at a region in which the computer modeling shows the residual stress to pass through the airfoil or shows the residual stress region to occupy a significantly large area of the cross sectional surface of the airfoil wall (as shown in FIG. 3), then the inspector can determine that the crack will pass through the airfoil wall if the airfoil is reused in a gas turbine engine.

Each crack found on the airfoil is compared with the resulting residual stress profile calculated in the computer modeling. If any crack is found to be located where the residual stress would promote crack growth to an unacceptable level, then the airfoil is determined to be beyond or near its useful life in a gas turbine engine.

Thus, using the process of identifying residual stress levels in regions where cracks occur, an inspector can identify which used airfoils can still be used in a gas turbine engine. Therefore, the operating expense of a gas turbine engine can be significantly reduced by not needing to purchase new airfoils.

The process of the present invention can also be used to determine if airfoils that are still located in a gas turbine engine can be reused or must be replaced when the engine is not operating. An inspector can use any known process of observing airfoils that are still mounted in the gas turbine engine in order to locate the cracks. Once the cracks are located, the process of determining the residual stress levels at the regions in which cracks are found can be used to determine if the particular airfoil can still be used or must be replaced.

The process of the present invention could be used for parts other than airfoils. Any part that could suffer damage from residual stress crack growth could make use of the process of the present invention. A rotary shaft for a critical component in which part failure would be catastrophic would apply. Any part in which the replacement by a new part would be costly could be used to determine if the old part is still usable.

I claim the following:

1. A process for determining a remaining life of a part, the process comprising the steps of:
   Establishing one or more boundary conditions for the part;
   Determining the material properties of the part;
   Determining residual stresses in the part;
   Observing the actual part for cracks;
   Comparing the location of the observed cracks with the residual stresses at the cracks;
   Establishing a maximum level of crack propagation at each crack; and,
   Rejecting the part if the residual stress at a particular crack is beyond the maximum level of crack propagation.

2. The process for determining a remaining life of a part of claim 1, and further comprising the step of:
   The step of establishing one or more boundary conditions for the part comprising establishing the temperature acting on the part, or establishing the pressure acting on the part, or establishing the loads that act on the part.

3. The process for determining a remaining life of a part of claim 1, and further comprising the step of:
   The step of determining residual stresses in the part comprises creating a 3D finite element model of the part and applying the established boundary conditions on the part.

4. The process for determining a remaining life of a part of claim 1, and further comprising the step of:
   The step of establishing a maximum level of crack propagation at each crack comprises determining if the crack has reached a stable size.

5. The process for determining a remaining life of a part of claim 1, and further comprising the step of:
   The step of establishing a maximum level of crack propagation at each crack comprises determining if the crack passes through a wall of the part.

6. The process for determining a remaining life of a part of claim 1, and further comprising the step of:
   The part is an airfoil for use in a gas turbine engine.

* * * * *